Feb. 15, 1966 F. SCOPARINO 3,235,266

TOY PHONOGRAPH

Filed July 5, 1962

INVENTOR.
FRANK SCOPARINO
BY
[signature]
ATTORNEY

United States Patent Office 3,235,266
Patented Feb. 15, 1966

3,235,266

TOY PHONOGRAPH

Frank Scoparino, New York, N.Y., assignor, by mesne assignments, to Mattel, Inc., Hawthorne, Calif., a corporation of California Filed July 5, 1962, Ser. No. 207,710
5 Claims. (Cl. 274—15)

The present invention relates to a phonograph, and especially to a hand-manipulated phonograph for the playing of a grooved disc record, of a type that is particularly adapted for installation within a toy, such as a doll or similar figurine.

The primary object of the present invention is to provide a phonograph or record player that is operated by a manually-wound spring motor in which the needle arm of the device is automatically returned to initial position over a record mounted on a turntable at the end of the playing of the record and is automatically placed in contact with the record at the end of the motor winding.

More specifically, the present invention is directed to the provision of a phonograph or record player, of the character described, which is driven by a spring-wound motor that is wound by a manually-manipulated cord or string, in which the release of the cord, after a motor-winding movement, automatically places the needle into contact with the record, in initial position, thereon, and in which, at the end of the record playing, the needle is automatically returned to initial position over the record.

It is the general object of the present invention to provide a phonograph or record player, of the character described, in which positioning of the needle on the record at the beginning of its reproduction is completely, automatically effected.

It is another object of the present invention to provide a phonograph or record player, of the character described, in which positioning of the needle on the record at the beginning of its reproduction is completely, automatically effected independently of the motor-winding operation.

It is a further object of the present invention to provide a phonograph or record player, of the character described, which is of relatively simple and sturdy construction, and may be produced and installed at relatively low cost.

The foregoing and other objects and advantages of the hand-manipulated phonograph of the present invention, will become more readily apparent to those skilled in the art from the embodiment thereof shown in the accompanying drawings and from the description following. It is to be understood, however, that such embodiment is shown by way of illustration only, to make the principles and practice of the invention more readily comprehensible and without intent of limiting the invention to the specific details therein shown.

Figure 1:
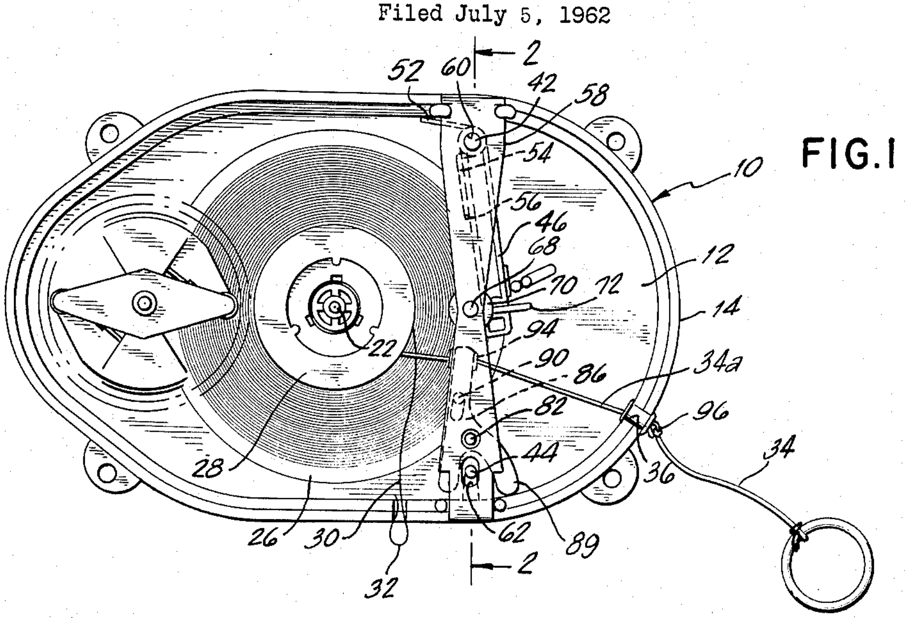
FIG. 1 is a top plan of one embodiment of a phonograph of the present invention, with its upper housing section removed.

Referring now, in greater detail, to the embodiment of the invention illustrated in the drawings, the phonograph device of the invention is shown as enclosed within a housing comprising a base section 10, including a base wall 12, and an upstanding peripheral wall 14, and a cover section, generally designated as 16, including a top wall 18, and a dependent peripheral wall 20, adapted to fit on the base wall 14; the top wall 18 having a circular opening 21, at one end thereof.

Supported between the base wall 12 of the base section 10 and the top wall 18 of the cover section 16, in position underlying an end portion of the opening 20, thereof, is a vertical spindle 22, on which is supported, in lowermost position, a turntable 24, on which is fixedly secured a spirally-grooved disc record 26. Also secured on the spindle 22, above the record 26, is a double spool or drum 28, in the lower section of which is secured a winding spring 30, whose free end is anchored in the upright wall 14 of the base housing section 10, as at 32. In the upper drum section there is secured one end of a winding cord or string 34, which extends to the exterior of the housing through an opening 36, similarly formed in the upright wall 14 of the housing base 10.

Set on the base 12 of the housing section 10, at diametrically opposed points under the circular opening 21 of the wall 18, are a pair of posts, 42 and 44. One of the posts, as 42, supports the needle arm 46, which has a needle 48, at one end and is provided at its other end with a bearing sleeve 50, that fits over the post 42. The needle arm 46 is normally biased, to be disposed with its needle end in elevated position above the starting point of a sound-reproducing groove in the record 26, which may be formed with one or more individual sound-reproducing grooves. This biased position of the needle arm 46 is effected by a torsion spring 52, that is mounted over post 42 below the needle arm 48 and is provided with a lateral extension 54, at its upper end that torsionally engages the record-facing side of the needle arm by means of an upper extension 56.

Sound reproduction is effected by means of a spring 58, which extends substantially diametrically across the base 10 and is formed with openings 60 and 62, that fit respectively over posts 42 and 44. The end of the spring adjacent opening 60 is immobilized between the flanges 14 and 20 of the base and cover 10 and 16, respectively. The other end of the spring extends through an opening 64, formed in the edge of the cover flange 20. Spring 58 is formed with a central opening 66, through which extends, in tightly-fitted relation, a pin 68, that is set on a base 70, disposed against the inner face of the spring 58 and normally rides on a rail 72, provided transversely of the needle arm 46 substantially immediately above the needle 48. The vertical relation between the needle arm and spring is such that the base 70 and the rail 72 elevate the center of the spring 58 so that it is arched at the center and its end within the recess 64, is held against the inner edge of the recess and is tensed thereagainst. This arrangement causes the arched center of spring 58 to press on rail 72 and to normally press it downwardly to disposed needle 48 against the record 26, countering the action of torsion spring 52. A speaker 74, of conventional, substantially conical shape is mounted by an opening in its center over the pin 68 and is held fixedly thereon, as by application of wax 76. The speaker is preferably formed and mounted so that its edge is disposed within the opening 21 of the cover 16 and out of contact with the protective flange 77, defining the opening thereof. By this tensed arrangement of spring 58, the vibrations of the needle 48 as it is moved over the track of the record 26 within which it is held by the tension of spring 58 are transmitted to the speaker 74. A post 78, set on the floor 12 of the bottom casing section 10 is provided adjacent turntable 22 to limit the movement of the needle arm under the biasing tension of torsion spring 52, to retain the needle at all times over the surface of the record 26.

It will be seen from the description of the device thus far presented that, when the spring motor is wound by the pulling of the string 34 and the spring is then released to release the motor for rotation, the needle 48, when in contact with the rotating record surface due to the pressure of spring 58, will engage in a groove of the record and be moved by the groove to follow its spiral course, inwardly to the end, and reproduce the sound recorded in such groove against the torsion of spring 52.

Means are provided for automatically returning the needle to initial position after completion of its movement in a record groove. Generally stated, such means comprises a mechanism that will automatically elevate the spring 58 slightly but sufficiently to release its pressure on the rail 72 of the needle arm 46, to thereby make the latter responsive solely to the pressure of torsion spring 52, which will both lift the needle arm and move it outwardly to initial position against post 78.

Such means may comprise a post 80, set on the bottom 12 of the housing section 10, preferably adjacent to the post 44. The post 80 is preferably formed with a thicker bottom portion and an upper portion 82, of reduced thickness, providing between them a flat shoulder 84. An arm 86, provided with an opening 88, which is of greater cross-section than the thickness of post section 82 is vertically slidably supported over post section 82, by its opening 88; normally resting on the shoulder 84. The arm 86 is arranged to have one end underlie spring 58; its other end being preferably forked, as at 89, to straddle post 44 for the purpose of inhibiting displacement of the other end of arm 86 from under spring 58. The inner end of arm 86 is provided with a projection 90, which normally, when the arm 86 rests on the shoulder 84, is disposed closely adjacent the underside of spring 58 and is in position that, when the arm 86 is slightly raised, the projection 90 will abut spring 58 to raise the same slightly so as to relieve its pressure through pin base 70, on rail 72 of needle arm 46 and release the latter for movement under tension of torsion spring 52, to the peripheral portion of record 26, and against post 78.

To lift arm 86 for the latter purpose, its inner end is provided with a transverse passageway 92, for winding string 34, which passageway is preferably defined by an eyelet 94, and is disposed slightly below the level of the string-winding section of the drum 28, as well as below the level of the winding string opening 30 formed in the wall 40 of the housing section 10. Thus, when the string 34 is tensed, such tensioning will tend to elevate arm 86 to press the end of projection 90 against the underside of spring 58 to raise it and release its downward pressure on needle arm 46.

Figure 4:
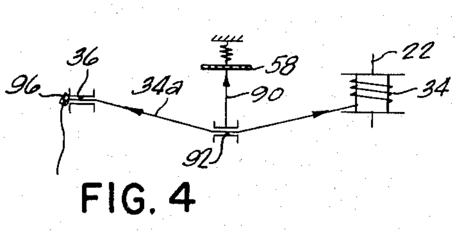
FIGS. 3 and 4 are, respectively, diagrammatic representations of the pressures exerted on the needle arm after completion of a record reproduction, during rewinding of the motor and after the motor has been rewound and released for unwinding.

In order to effect the automatic raising of arm 86 and the release of such pressure on the needle arm 46 at the end of a playing movement of the latter, when the needle is closest to the center of the record 26, I limit the operative length 34*a* of motor-winding string 34 so that such operative length is only sufficient to permit the unwinding of the motor spring 30 enough to complete a playing of the record 26 but not sufficiently long to permit complete unwinding of the motor spring 30. By this arrangement, when the needle is at the center of the record but before the motor spring is unwound, the limiting means, such as the knot 96, or similar obstacle, provided on the string 34, at the end of its operating length, exteriorly of the housing section 10, abut the edge of opening 30 and will prevent further unwinding of the motor and cause string section 34*a* to become tensed by the unwound spring and raise arm 86 to release pressure of spring 58 on the needle arm rail 72, to permit the needle arm to return to initial position against post 78 with the needle 48 poised for starting a new record reproduction. This is illustrated in FIG. 4.

A second playing of the record is initiated by the pulling of string 34 to wind the motor, and the string is then released. Such release of the string will release the tension on string section 34*a* to relax it and permit arm 86 to drop and thereby reinstate the pressure of spring 58 on the rail 72 of needle arm 46, to press the poised needle 48 down on the record, into playing position.

Figure 3:
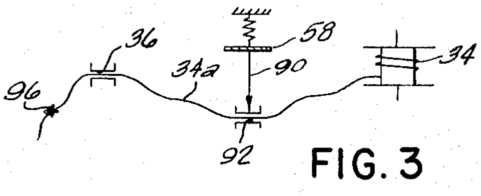
Figure 2:
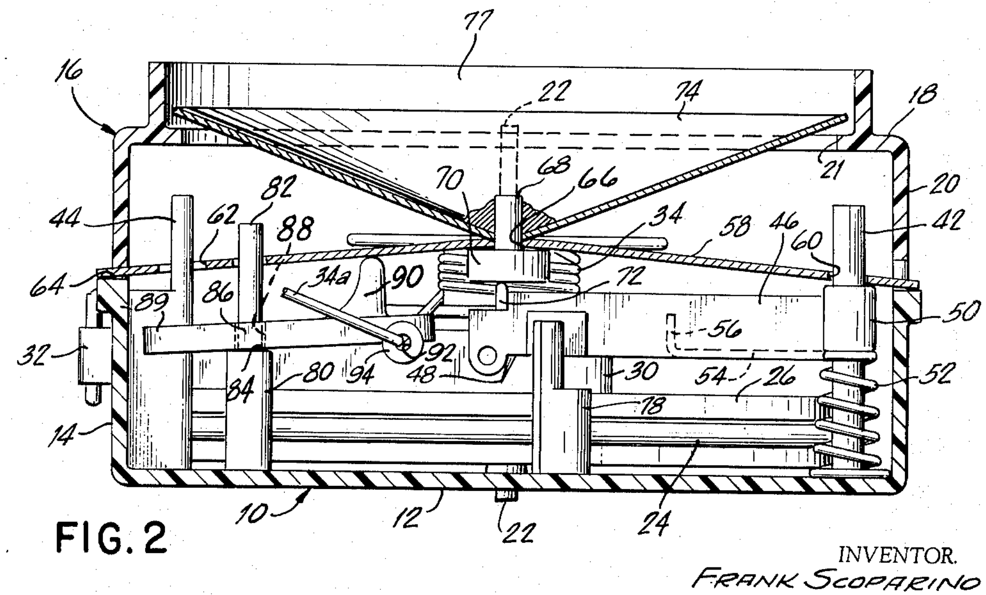
FIG. 2 is a section, on an enlarged scale, taken on line 2—2 of FIG. 1.

The relaxed position of string section 34*a* will continue until the knot abuts the edges of string opening 30, as the needle completes a record playing movement. This will again tense string section 34*a*, to raise arm 86 and permit needle arm 46 to return to initial position as described. The relaxed position of string 34*a* is illustrated in FIG. 3.

It may here be stated that rail 72 and pin base 70 are of such length and areas that the latter, at all times overhangs a portion of the rail 72, in position to press the needle point down on the record and to keep it there as long as the string section 34*a* is loose or relaxed.

This completes the description of the phonograph of the present invention and the manner in which it operates for the automatic resetting of its needle arm after each record reproduction. It will be apparent that such phonograph is, except for the motor winding operation completely automatic in its operation, so that it is least subject to be upset or disturbed and put out of order by any error or mishap on the part of the operator and will, at all times, operate in a uniform manner.

It will also be apparent that the phonograph of the present invention is simple and easy to operate and is of relatively simple and sturdy construction, composed of a minimum number of relatively simple and sturdy parts that will not readily break or go out of order.

It will be further apparent that the phonograph is, because of the foregoing characteristics, particularly suitable and adaptable for installation in dolls or other toy figurines for manipulation even by small children.

It will be still further apparent that numerous variations and modifications may be made in the phonograph of the present invention, in accordance with the principles of the present invention and without the exercise of any inventive ingenuity. I desire, therefore, to be protected for any and all such variations and modifications that may be made within the spirit of the invention and the scope of the claims hereto appended.

What I claim is:

1. In a phonograph of the character described, comprising a housing including a base, a string-wound spring motor including an axial shaft rotatably supported on said base, and a turntable for a record mounted on such shaft, a winding string connected to said motor, a needle arm and means rotatably and vertically slidably supporting said needle arm on said base for radial movement across said turntable and vertical sliding movement toward and from said turntable, spring means mounting a speaker and resiliently pressing the needle end of said needle arm towards said turntable, means for automatically resetting said needle arm to an initial position after the playing of a record on said turntable and comprising resilient means of lesser tensioning power than said spring means engaging said needle arm urging the same to slide vertically away from said turntable, and means for flexing said spring means upwardly away from said needle arm during the winding of the motor and after partial unwinding of the same.

2. In a phonograph of the character described, comprising a housing including a base, a string-wound spring motor including an axial shaft rotatably supported on said base, and a turntable for a record mounted on such shaft, a winding string connected to said motor, a needle arm and means rotatably and vertically slidably supporting said needle arm on said base for radial movement across said turntable and vertical sliding movement toward and from said turntable, spring means mounting a speaker and resiliently pressing the needle end of said needle arm towards said turntable, means for automatically resetting said needle arm to an initial position after the playing of a record on said turntable and comprising resilient means of lesser tensioning power than said spring means engaging said needle arm urging the same to slide vertically away from said turntable, and means for flexing said spring means upwardly away from said needle arm during the winding of the motor and after partial unwinding of the same, said needle arm supporting means comprising a post set on said base, one end of said needle arm being slidably mounted on said post, and a torsion spring mounted over said post intermediate said needle arm end and said base, said torsion spring including an extension lying against one side of said needle arm, said extension including an offset end engaged against an adjacent side of said needle arm, said extension and offset end biased to move said needle arm away from said turntable and from said shaft.

3. In a phonograph of the character described, comprising a housing including a base, a string-wound spring motor including an axial shaft rotatably supported on said base, and a turntable for a record mounted on such shaft, a winding string connected to said motor, a needle arm and means rotatably and vertically slidably supporting said needle arm on said base for radial movement across said turntable and vertical sliding movement toward and from said turntable, spring means mounting a speaker and resiliently pressing the needle end of said needle arm towards said turntable, means for automatically resetting said needle arm to an initial position after the playing of a record on said turntable and comprising resilient means of lesser tensioning power than said spring means engaging said needle arm urging the same to slide vertically away from said turntable, and means for flexing said spring means upwardly away from said needle arm during the winding of the motor and after partial unwinding of same, said needle arm supporting means comprising a post set on said base, one end of said needle arm being slidably mounted on said post, and a torsion spring mounted over said post intermediate said needle arm end and said base, said torsion spring including an extension lying against one side of said needle arm, said extension including an offset end engaged against an adjacent side of said needle arm, said extension and offset end biased to move said needle arm away from said turntable and from said shaft, said means for flexing said spring upwardly from said needle arm comprising a member disposed adjacent said spring means and means supporting said member for movement toward and away from said spring, said member being engaged by said winding string, and means limiting the operating length at said string to thereby limit the unwinding of the spring of said motor and tension said operating length of said string during the motor winding and after its partial unwinding, to move said member against said spring and move said spring upwardly away from said needle arm.

4. In a phonograph of the character described, comprising a housing including a base, a string-wound spring motor including an axial shaft rotatably supported on said base, and a turntable for a record mounted on such shaft, a winding string connected to said motor, a needle arm and means rotatably and vertically slidably supporting said needle arm on said base for radial movement across said turntable and vertical sliding movement toward and from said turntable, spring means mounting a speaker and resiliently pressing the needle end of said needle arm towards said turntable, means for automatically resetting said needle arm to an inital position after the playing of a record on said turntable and comprising resilient means of lesser tensioning power than said spring means engaging said needle arm urging the same to slide vertically away from said turntable, and means for flexing said spring means upwardly away from said needle arm during the winding of the motor and after partial unwinding of same, said needle arm supporting means comprising a post set on said base, one end of said needle arm being slidably mounted on said post, and a torsion spring mounted over said post intermediate said needle arm and said base, said torsion spring including an extension lying against one side of said needle arm, said extension including an offset end engaged against an adjacent side of said needle arm, said extension and offset end biased to move said needle arm away from said turntable and from said shaft, said means for flexing said spring upwardly from said needle arm comprising a member disposed adjacent said spring means and means supporting said member for movement toward and away from said spring said member being engaged by said winding string, and means limiting the operating length of said string to thereby limit the unwinding of the spring of said motor and tension said operating length of said string during the motor winding and after its partial unwinding, to move said member against said spring and move said spring upwardly away from said needle arm, said spring means comprising an elongated leaf spring confined in said housing at one end and slidably held in said housing at its other end, and wherein said member comprises an arm and the means supporting said member comprises a post set on said base, said arm and said post having cooperating means for slidably supporting said arm with an end thereof adjacent a face of said spring means for movement toward and away from said spring, said arm end having a passageway therethrough for said winding string at a level lower than the level of the point of attachment of said winding string to said motor shaft.

5. In a phonograph of the character described, comprising a housing including a base, a string-wound spring motor including an axial shaft rotatably supported on said base, and a turntable for a record mounted on such shaft, a winding string connected to said motor, a needle arm and means rotatably and vertically slidably supporting said needle arm on said base for radial movement across said turntable and vertical sliding movement toward and from said turntable, spring means mounting a speaker and resiliently pressing the needle end of said needle arm towards said turntable, means for automatically resetting said needle arm to an initial position after the playing of a record on said turntable and comprising resilient means of lesser tensioning power than said spring means engaging said needle arm urging the same to slide vertically away from said turntable, and means for flexing said spring means upwardly away from said needle arm during the winding of the motor and after partial unwinding of same, said needle arm supporting means comprising a post set on said base, one end of said needle arm being slidably mounted on said post, and a torsion spring mounted over said post intermediate said needle arm end and said base, said torsion spring including an extension lying against one side of said needle arm, said extension including an offset end engaged against an adjacent side of said needle arm, said extension and offset end biased to move said needle arm away from said turntable and from said shaft, said means for flexing said spring upwardly from said needle arm comprising a member disposed adjacent said spring means and means supporting said member for movement toward and away from said spring, said member being engaged by said winding string, and means limiting the operating length of said string to thereby limit the unwinding of the spring of said motor and tension said operating length of said string during the motor winding and after its partial unwinding, to move said member against said spring and move said spring upwardly away from said needle arm, said means limiting the operating length of said string comprising a passageway for said string formed in said housing and an enlargement provided on said string of greater size than the cross-section of said opening, said enlargement formed on said string at a distance from its connection to said motor shaft to engage the edges of said opening before said motor spring is completely unwound.

References Cited by the Examiner

UNITED STATES PATENTS

| | | | |
|---|---|---|---|
| 2,866,646 | 12/1958 | Kindred | 274—9 |
| 3,082,006 | 3/1963 | Ryan | 274—9 |

NORTON ANSHER, *Primary Examiner.*

EMIL G. ANDERSON, *Examiner.*